(12) United States Patent
Domen et al.

(10) Patent No.: US 7,314,607 B1
(45) Date of Patent: Jan. 1, 2008

(54) MESO-POROUS TRANSITION METAL OXIDE HAVING CRYSTALLIZED PORE WALL AND METHOD FOR PREPARING THE SAME

(75) Inventors: Kazunari Domen, Kanagawa-ken (JP); Li Byonjin, Tokyo (JP); Junko Nomura, Kanagawa-ken (JP)

(73) Assignee: Japan Science and Technology Corporation et al. (JP)

( * ) Notice: Subject to any disclaimer, the term of this patent is extended or adjusted under 35 U.S.C. 154(b) by 805 days.

(21) Appl. No.: 10/257,924

(22) PCT Filed: Nov. 24, 2000

(86) PCT No.: PCT/JP00/08266

§ 371 (c)(1),
(2), (4) Date: Oct. 18, 2002

(87) PCT Pub. No.: WO01/96242

PCT Pub. Date: Dec. 20, 2001

(30) Foreign Application Priority Data

Jun. 12, 2000 (JP) .............................. 2000-175306

(51) Int. Cl.
C01G 9/00 (2006.01)
C01G 25/00 (2006.01)
C01G 33/00 (2006.01)
C01G 35/00 (2006.01)

(52) U.S. Cl. .............................. 423/594.8; 423/594.14; 423/594.12

(58) Field of Classification Search ................ 423/598, 423/594.8, 594.12, 593.1, 592.1, 595, 599, 423/594.14, 594.1, 594.3, 594.5, 594.7, 594.9, 423/594.13
See application file for complete search history.

(56) References Cited

U.S. PATENT DOCUMENTS 5,698,483 A * 12/1997 Ong et al. ..................... 501/12
6,420,063 B1 * 7/2002 Ozin et al. ..................... 429/40
6,482,387 B1 * 11/2002 Gulgun et al. ........... 423/593.1
6,752,979 B1 * 6/2004 Talbot et al. ............. 423/592.1
6,890,768 B2 * 5/2005 Karaswaw et al. ............ 438/3

OTHER PUBLICATIONS

Byonjin, et al., "Synthesis of High Surface Area Microporous Niobium Oxide Using Neutral Template and Characterization" 88th Catalytic Forum of Catalytic Society, Sep. 20, 2001.*
Yang, et al., Block Copolymer Templating Syntheses of Mesoporous Metal Oxides with Large Ordering Lengths and Semicrystalline Framework, Chem. Mater. 1999, 11, 2813-2826.
Yang, et al., Generalized Synthesis of Large-Pore Mesoporous Metal Oxides with Semicrystalline Frameworks, Nature, vol. 396, Nov. 12, 1998, 152-155.
Antonelli, et al. Ligand-assisted Liquid Crystal Templating in Mesoporous Niobium Oxide Molecular Sieves, Inorg. Chem 1996, 35, 3126-3136.
Luca, et al., Synthesis and Characterization of Mesostructured Vanadium Oxide, Chem. Mater. 1995, 7, 2220-2223.
Antonelli, et al., Synthesis and Characterization of Hexagonally Packed Mesoporous Tantalum Oxide Molecular Sieves, Chem. Mater. 1996, 8, 874-881.
Yue, et al., Synthesis of Mesoporous TiO2 with a Crystalline Framework, Chem. Commun. 2000, 1755-1756.

* cited by examiner

*Primary Examiner*—Steven Bos
(74) *Attorney, Agent, or Firm*—H. Jay Spiegel; Robert L. Haines (57) ABSTRACT

A meso porous transition metal oxide comprising one or more transition metal oxides, wherein the metal is selected from the group consisting of Ti, V, Cr, Mn, Fe, Co, Ni, Cu, Zn, Ga, Ge, Zr, Nb, Mo, Ru, Cd, In, Sn, Sb, Hf, Ta, W and Re, and the pore wall of the meso pore thereof has a crystalline structure; and a method for preparing the meso porous transition metal oxide, characterized as comprising a step of carrying out a secondary calcination at 600-800° C. for 10 minutes to 10 hours.

1 Claim, 7 Drawing Sheets

Fig.2

B: Secondary calcination 650°C, 1 hour (crystallized)
A: Previous calcination(450°C), 20 hours (amorphous)

Fig.5 electron beam diffraction pattern of particle

Fig. 6

Transmission electron microscope image by high magnification

MESO-POROUS TRANSITION METAL OXIDE HAVING CRYSTALLIZED PORE WALL AND METHOD FOR PREPARING THE SAME

FIELD OF THE INVENTION

The present invention relates to a meso-porous transition metal oxide characterized by the pore wall of the meso pore having a crystalline structure, particularly, the crystalline structure is maintained over the whole primary particles, and further relates to the method for preparation of the meso-porous transition metal oxide. In the present invention, the term meso pore means the fine pore whose pore size is from 2 nm to 50 nm, especially smaller than 15 nm, and further means the fine pore (meso pore) characterized in that the nitrogen adsorption isotherm line rises rapidly at the region of $P/P_0=0.6$ and becomes flat at the region above $P/P_0=0.8$.

BACKGROUND OF THE INVENTION

It is well-known that a surfactant organizes silica into a variety of meso-porous structures through the mediation of electro static force, hydrogen bond, covalent bond or van der Waals interactions. The pore wall of meso-porous structural silica prepared by using the surfactant as a matrix is amorphous. This method of forming meso-porous structures has been tried with non-silica oxides. Due to sporadic success, this trial is extended to a material which applies the physical characteristics such as electron transfer or magnetic interactions.

Regarding oxides such as $TiO_2$, $ZrO_2$, $Al_2O_3$, $Nb_2O_5$, $Ta_2O_5$, $WO_3$, $HfO_2$, $SnO_2$ or metal oxides including mixed oxides such as $SiAlO_{3.5}$, $Si_2AlO_{5.5}$, $SiTiO_4$, $ZrTiO_4$, $Al_2TiO_5$ or $ZrW_2O_8$, there is a paper reporting that a material which has a meso porous structure having thermally stable and ordered pores of relatively large size (up to 140 Å, 14 nm) and which can be broadly applied is obtained [NATURE, Vol. 396, 152-155 (1998):

[hereinafter shortened to Paper A].

In that paper, the following items are reported. Namely, the product original material is prepared by dissolving 1 g of polyalkyleneoxide block copolymer [$HO(CH_2CH_2O)_{20}$ $(CH_2CH(CH_3)O)_{70}(CH_2CH_2OCH_2CH_2O)_{20}H$, hereinafter shortened to $EO_{20}PO_{70}EO_{20}$; Pluronic P-123, product of BASF] into 10 g of ethanol (EtOH). To this solution 0.01 mol of the respective inorganic chloride precursor is added with vigorous stirring for half hour so as to obtain a sol solution which is poured into an open Petri dish and placed in the atmosphere of 40° C. for 1 to 7 days to gel. During the gelling process, the inorganic chloride precursor (chloride of transition metal) is hydrolyzed and polymerized, and organized to a metal oxide network structure. Alternatively, a material to be coated, such as a substrate, is dipped into the sol solution such that a coated film is formed on the surface of the substrate and a gel product is prepared according to the above mentioned reaction. In this case, it is reported that the appearance of all such made products are transparent except the appearance of product derived from $WO_3$ is dark blue.

The obtained gel product is then heated at 400° C. for 5 hours and the surfactant is removed by this calcination process, and $ZrO_2$ having meso structure corresponding to the matrix of $EO_{20}PO_{70}EO_{20}$ is obtained.

The authors of the paper surmise that the formation of the meso structure is by way of a mechanism which combines the self organization of the block copolymer and the complexation of the inorganic species (segment of alkylene oxide forms crown ether type complex).

Further, the paper reports that although the pore wall of meso porous silica is amorphous, the above mentioned pore wall of the meso structure has a structure possessing a crystalline domain of nano size (up to 30 Å, 3 nm) in a comparatively thick amorphous wall.

Furthermore, in the paper, the sequence of atomic (lattice surface) and chemical components (in which the metal oxide is governable) of the net work structure are considered by an X ray diffraction method (XRD) or by an energy dispersive type X ray spectroscopic method (EDX), and the ordered semi crystalline inorganic stereo network characteristic of the meso structure is investigated by a conventional transmission electron microscope. The authors explain that the pore wall has a structure characterized in that the nano crystalline structure smaller than 30 Å is embedded in an amorphous matrix.

Still further, regarding the pores, by considering the $N_2$, adsorption/desorption isothermal characteristic, the type of pore, porosity (smaller than approximately 50%) and pore size (50-140 Å) are investigated. According to the investigation by the inventors of the present invention, since the pore wall described in the paper is composed of amorphous matrix, it is obvious that the pore wall has problems in that the thermal or hydrothermal stability is comparatively small and the walls physically fragile.

The inventors of the present invention determined that the method to resolve the above mentioned problems which a meso size structure composed of well known metal oxide has is to make the metal oxide having a crystallized pore wall.

Therefore, the object of the present invention is to provide a meso porous transition metal oxide characterized in that the pore wall maintains a crystalline structure over the whole primary particles, and to provide a method for preparation of such meso porous transition metal oxide having the crystalline structure.

DISCLOSURE OF THE INVENTION

The first aspect of the present invention is the meso porous transition metal oxide characterized in that the pore wall of the meso pore has a crystalline structure. Desirably, the present invention is the meso porous transition metal oxide characterized in that the crystalline structure is maintained over the whole primary particles. More desirable is the meso porous transition metal oxide characterized in that the pore wall of the meso pore has the crystalline structure from which a diffraction peak by electron beam diffraction is observed. Further desirable is the meso porous transition metal oxide characterized in that the nitrogen adsorption isotherm line rises rapidly at the region of $P/P_0=0.6$ and becomes flat at the region above $P/P_0=0.8$. Still further desirable, the present invention is the meso porous transition metal oxide wherein the metal of the transition metal oxide is one or more than two kinds of metal elements selected from the group consisting of Ti, V, Cr, Mn, Fe, Co, Ni, Cu, Zn, Ga, Ge, Zr, Nb, Mo, Ru, Cd, In, Sn, Sb, Hf, Ta, W and Re.

The second aspect of the present invention is the method for preparation of the meso porous transition metal oxide characterized in that the pore wall of meso pore has a crystalline structure comprising, adding a transition metal salt which is a precursor of the transition metal oxide into a solution prepared by dissolving a polymer surfactant into an organic solvent and dissolving, transforming the transition metal salt to a sol solution by hydrolysis and polymerization, obtaining an aimed gel state product from the sol solution and carrying out a primary calcination on the product at a temperature of 400±50° C. for 5-20 hours, then carrying out a secondary calcination at the temperature of 600-800° C. for 10 minutes to 10 hours. Desirably, the second aspect of the present invention is the method for preparation of a meso porous transition metal oxide characterized in that the pore wall of the meso pore has a crystalline structure, wherein the transition metal salt which is a precursor of the transition metal oxide is selected from a chloride, a nitrate of at least one metal element selected from the group consisting of Ti, V, Cr, Mn, Fe, Co, Ni, Cu, Zn, Ga, Ge, Zr, Nb, Mo, Ru, Cd, In, Sn, Sb, Hf, Ta, W and Re or a voluntary mixture of them.

The present invention will be illustrated in more detail according to the following description.

A. As a surfactant which is used for the formation of nano size fine pores of the present invention, the surfactant which is used in the above mentioned paper can be used. That is, polyalkylene oxide block copolymer composed of oligomer (containing polymer) of ethylene glycol, oligomer (containing polymer) of polypropylene glycol and the compound prepared by etherification of an end group of the block copolymer using alcohol or phenol can be mentioned. These compounds are the desirable surfactant, because the toxicity of these compounds is very low. Further, besides these compounds, the compound which is used as the conventional template compound to form nano size pores can be used.

The mole ratio of the above mentioned surfactant to the metal salt forming the above mentioned metal oxide is approximately from 40 to 60, and this ratio is not essentially different from that of the case disclosed in the afore mentioned public known paper.

The total volume of fine pores of metal oxide which can be obtained depends on the content and the size of the nonionic surfactant contained in the starting solvent. Still more, the channel structure of the meso pore size or the size depend on the molecular weight or size of the above mentioned surfactant or non-aqueous solvent. Therefore, the amount and the size of the organic molecule to be used in the solvent are selected so that the desired meso pore-total volume and meso pore channel size can be obtained. As the water insoluble compound, besides alcohols such as ethanol, an oxygen containing organic solvent such as ether or acetone, further, pyridine or aniline can be used.

B. As the transition metal salt, which is a precursor forming the above mentioned transition metal oxide, the compound selected from the group consisting of chloride or nitride of the above mentioned metal and voluntarily mixtures of them can be used. Especially, the chloride is used as the desirable material.

The transition metal oxide precursor is hydrolyzed and polymerized and transformed to the metal oxide network structure. The pre organization of meso structural fine pore systematized under the interaction with the above mentioned surfactant is formed (fine pores are formed according to the removal of the surfactant by calcination).

As the transition metal, at least one element selected from the group consisting of Ti, V, Cr, Mn, Fe, Co, Ni, Cu, Zn, Ga, Ge, Zr, Nb, Mo, Ru, Cd, In, Sn, Sb, Hf, Ta, W and Re can be used.

EXAMPLE

Example 1

Preparation of Meso Porous Metal Oxide 1 g of nonionic surfactant (Pluronic L-121, L-101, L-61, L-64, L-31, P-123, P103, P-85, F-108, F-88 or F-68) and totally 0.005 to 0.015 mol of chloride of tantalum and niobium are added to 10 g of normal alcohol (methanol, ethanol, propanol, buthanol or hexanol) with vigorous stirring at room temperature for 30 minutes to obtain a sol solution. The sol solution is stood at 40° C. for 1 to 24 days and the transparent specimen (gel) generates.

The generated transparent specimen is calcined (primary calcination) at the temperature of 400° C. under a constant flow of air for 5-20 hours. Then the calcination temperature is elevated to 650° C. and the calcination is continued another 1 hour (secondary calcination) and the aimed product is obtained.

Figure 1:
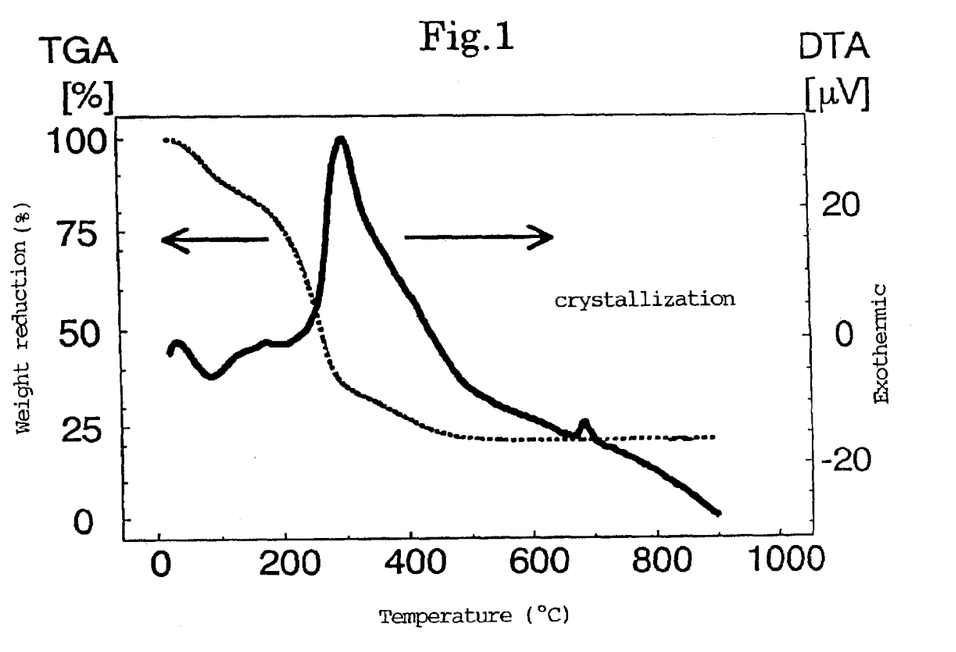
FIG. 1 is a graph showing the relationship between the calcination temperature (removal of surfactant) of the gel product of Example 1, weight reduction (TGA:%) and exothermic (DTA).

In the calcination process of the above mentioned transparent specimen, the relationship between weight reduction (TGA:%), exothermic (DTA) and the calcination temperature (C) is shown in FIG. 1. The exothermic peak at 300° C. is the peak of calcination of surfactant. And, the small peak at 680° C. is the peak of crystallization of pore wall, that is, the peak means the crystallization exothermic peak.

Figure 2:
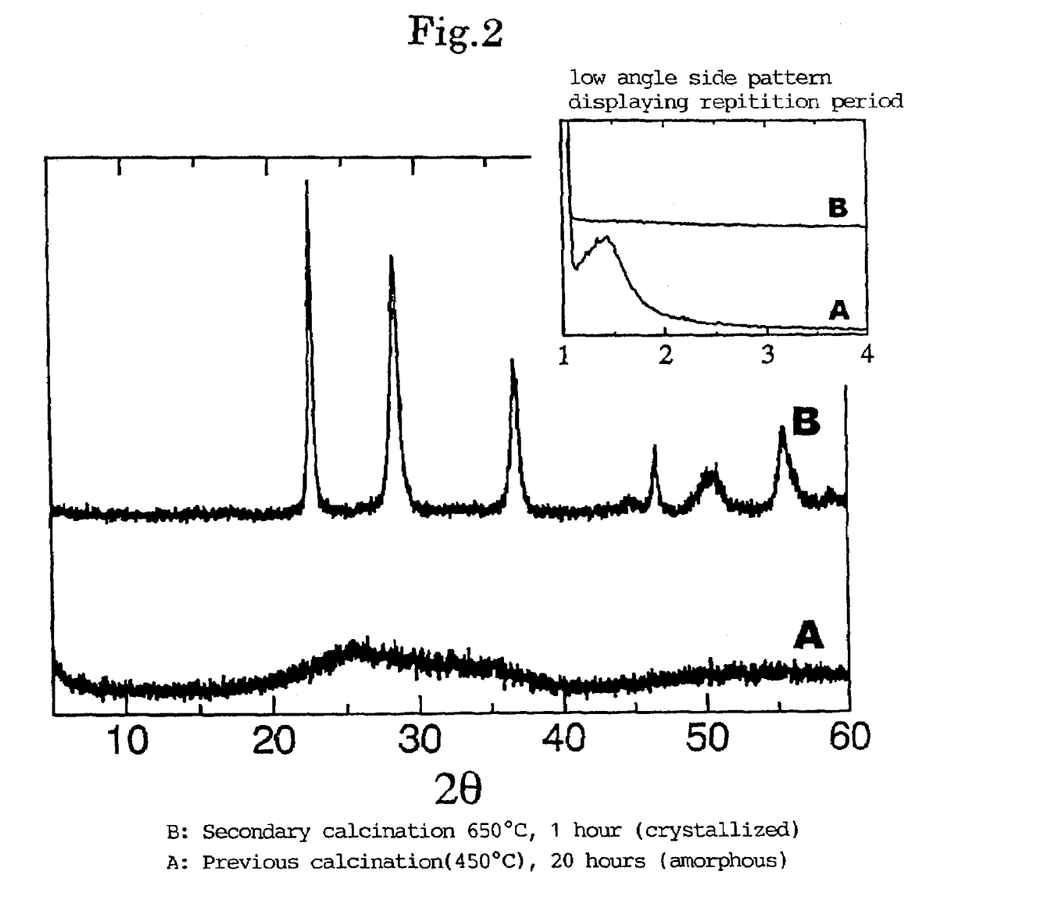
FIG. 2 is a graph showing the X-ray diffraction pattern of the meso porous transition metal oxide of Example 1.

FIG. 2 indicates the X-ray diffraction pattern of the meso porous transition metal oxide showing that the pore wall of obtained meso pore has crystalline structure.

In FIG. 2, A is the X-ray diffraction pattern of product after the primary calcination (400° C., 20 hours amorphous). No diffraction peak is observed, and indicates that the pore wall is in an amorphous state. While, B is the X-ray diffraction pattern of product after the secondary calcination (650° C., 1 hour, crystallized). The small graph in the upper part is the low-angle side pattern displaying repetition period.

Figure 3:
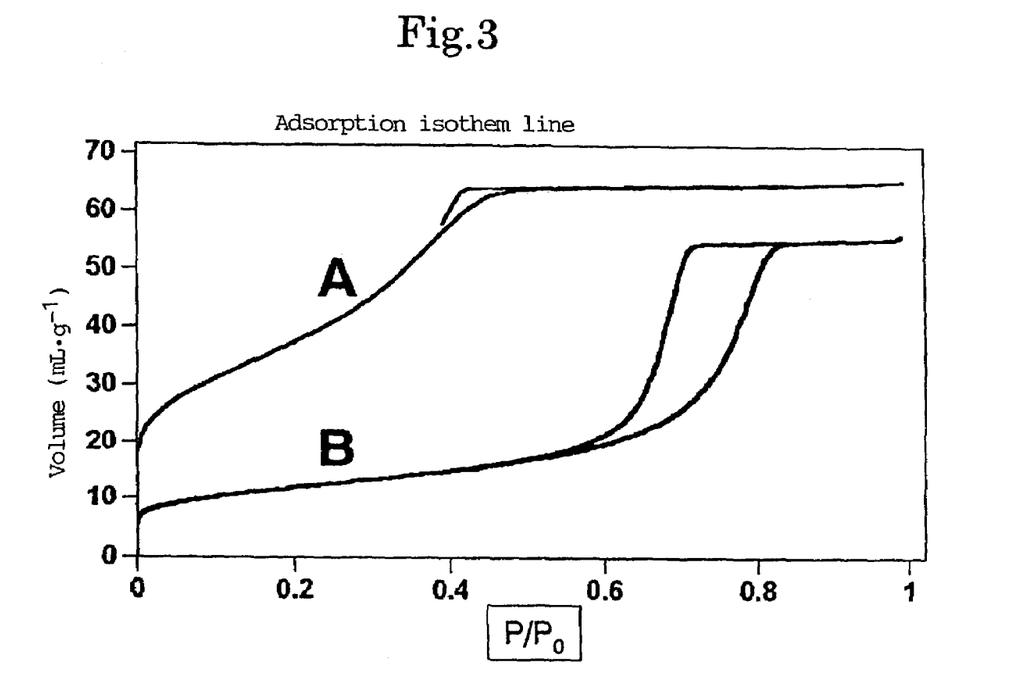
FIG. 3 is a graph showing the $N_2$ adsorption isotherm line of product (A) obtained by the primary calcination process (400° C., for 20 hours) and product (B) obtained after the secondary calcination process (650° C., for 1 hours).

In FIG. 3, the $N_2$ adsorption isotherm lines of product after the primary calcination (A) and after the secondary calcination (B) are shown. When $N_2$ adsorption isotherm line A is compared with the $N_2$ adsorption isotherm line B, from the adsorption characteristic of the product after second calcination, it is obviously understood that the radius of fine pore is large, and from the rising characteristic, it is understood that the product has uniform fine pores.

Figure 4:
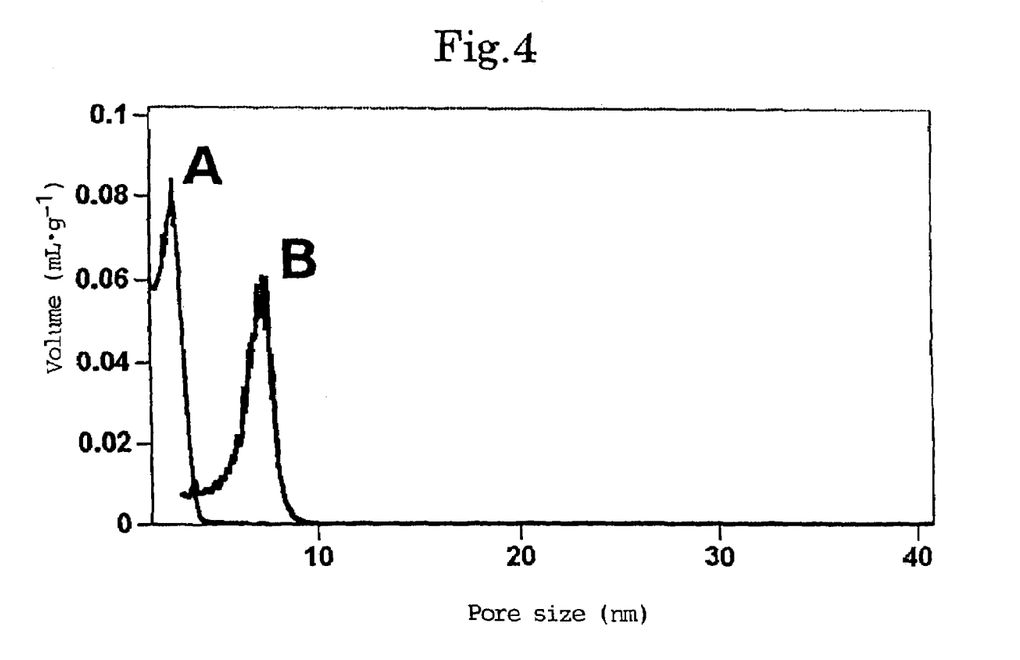
FIG. 4 is a graph showing the distribution of fine pores of product (A) obtained by the primary calcination and product (B) obtained after the secondary calcination of Example 1.

FIG. 4, is the distribution of fine pores of product after the primary calcination (A) and after the secondary calcination (B) displayed by fine pore size, and is corresponding to the characteristic of FIG. 3.

Figure 5:
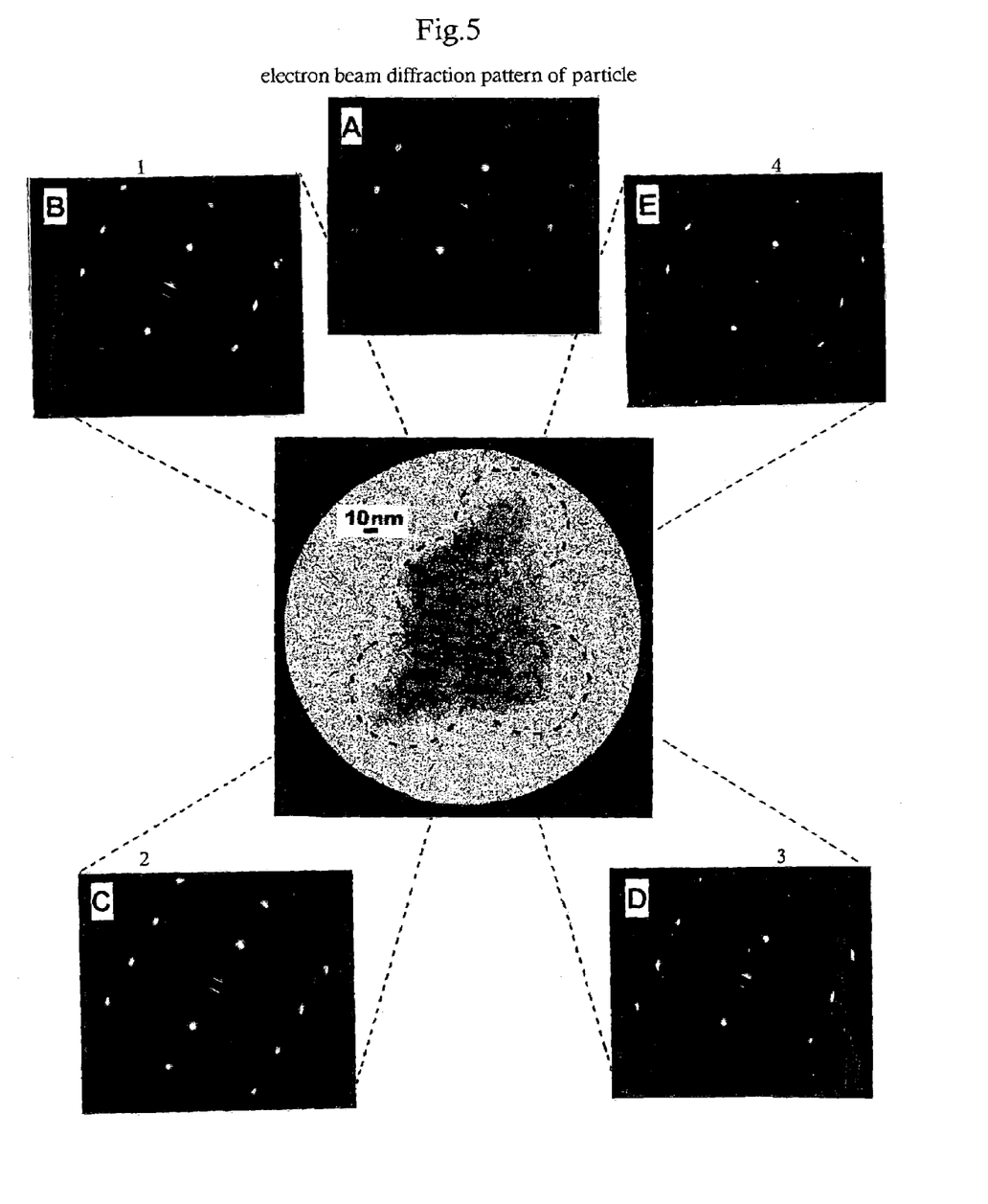
FIG. 5 is an electron beam diffraction pattern (picture) of whole primary particles after the secondary calcination of Example 1.

FIG. 5 shows the whole electron beam diffraction pattern of product (primary particles) after the secondary calcination (B), and it is obviously understood that the whole is a crystalline structure.

Figure 6:
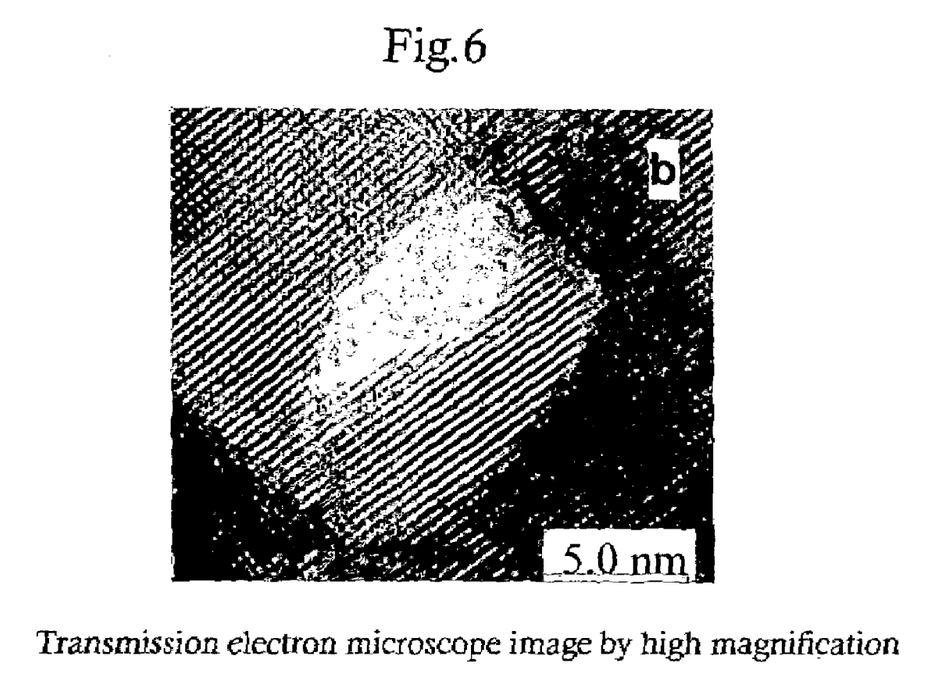
FIG. 6 is a transmission electron microscope (TEM) image (picture) of the product after the secondary calcination of Example 1.

FIG. 6 is a transmission electron microscope (TEM) picture of 800,000 magnifications, and the diffraction pattern of long period can be observed. From this TEM picture it is also obviously understood that the whole pore wall is a crystalline structure.

The specimens of the product are respectively exposed in the following conditions, namely, 600° C. for 20 hours, hydrothermal atmosphere of 200° C. for one day and 500 kg/cm$^2$ for 10-20 hours. Then thermal stability, hydrothermal stability and pressure stability are measured by checking whether the original fine pore structure and pore wall characteristic are maintained as is or not. The results show that the fine pore structure and pore wall characteristic are maintained stable.

Example 2

Preparation of Meso Porous Metal Oxide 1 g of $EO_{20}PO_{70}EO_{20}$ (Pluronic P-123), further totally 0.005 to 0.015 mol of chloride of zinc and niobium are added to 10 g of normal alcohol (ethanol, or butanol) with vigorous stirring at room temperature for 30 minutes to obtain a sol solution. The sol solution is stood at 40° C. for 1 to 30 days and the transparent specimen (gel) generates. The generated transparent specimen is calcined (primary calcination) at a temperature of 400° C. under a constant flow of air for 5-20 hours. Then the calcination temperature is elevated to 600° C. and the calcination is continued another 10 minutes to 1 hour (secondary calcination) and the aimed product is obtained.

Figure 7:
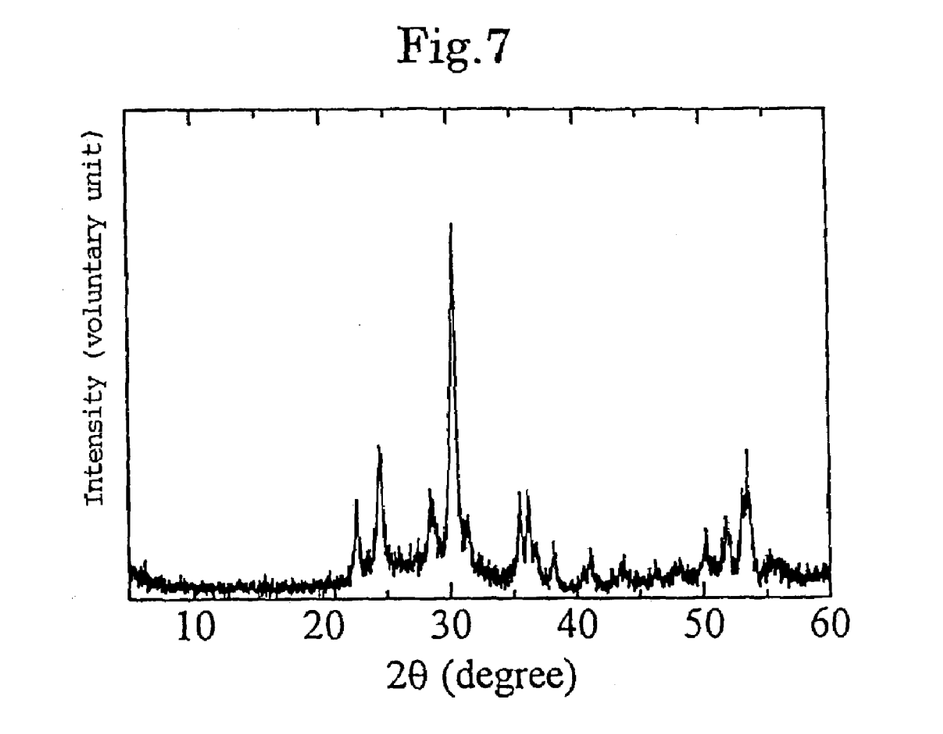
FIG. 7 is a graph showing the X-ray diffraction pattern of the meso porous transition metal oxide showing the crystalline structure of $ZnNb_2O_6$ of Example 2.
Figure 8:
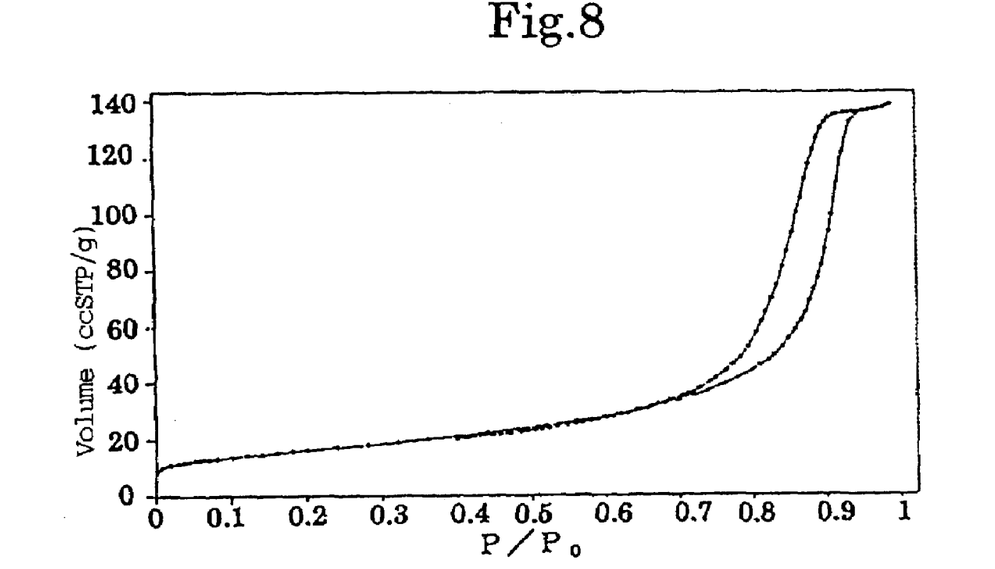
FIG. 8 is a graph showing the $N_2$ adsorption isotherm line of a transition metal oxide after the primary calcination and after the secondary calcination of Example 2.

In FIG. 7, the X-ray diffraction pattern of the obtained meso porous transition metal oxide having the crystalline structure of $ZnNb_2O_6$ is shown, and in FIG. 8, the $N_2$ adsorption isotherm lines of the transition metal oxide after the primary calcination and after the secondary calcination are shown.

Example 3

Preparation of Meso Porous Metal Oxide 1 g of $EO_{20}PO_{70}EO_{20}$ (Pluronic P-123), further totally 0.005 to 0.015 mol of chloride of zirconium and niobium are added to 10 g of ethanol with vigorous stirring at room temperature for 30 minutes to obtain a sol solution. The sol solution is stood at 40° C. for 1 to 30 days and the transparent specimen (gel) generates.

The generated transparent specimen is calcined (primary calcination) at the temperature of 400° C. under a constant flow of air for 5-20 hours. Then the calcination temperature is elevated to 750° C. and the calcination is continued another 30 minutes to 1 hour (secondary calcination) and the aimed product is obtained.

Figure 9:
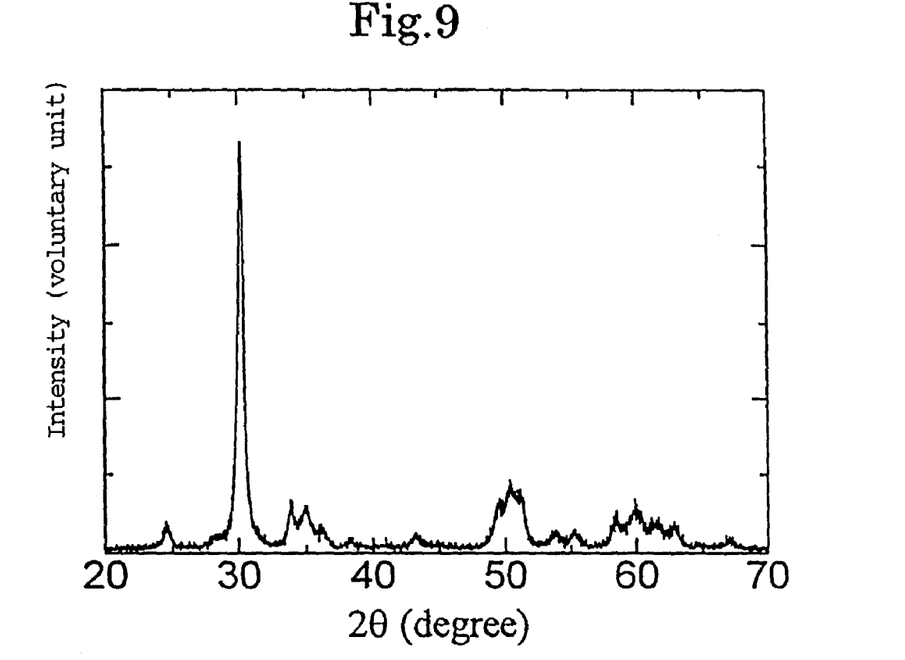
FIG. 9 is a graph showing the X-ray diffraction pattern of a meso porous transition metal oxide showing the crystalline structure of $Zr_6Nb_2O_{17}$ of Example 3.
Figure 10:
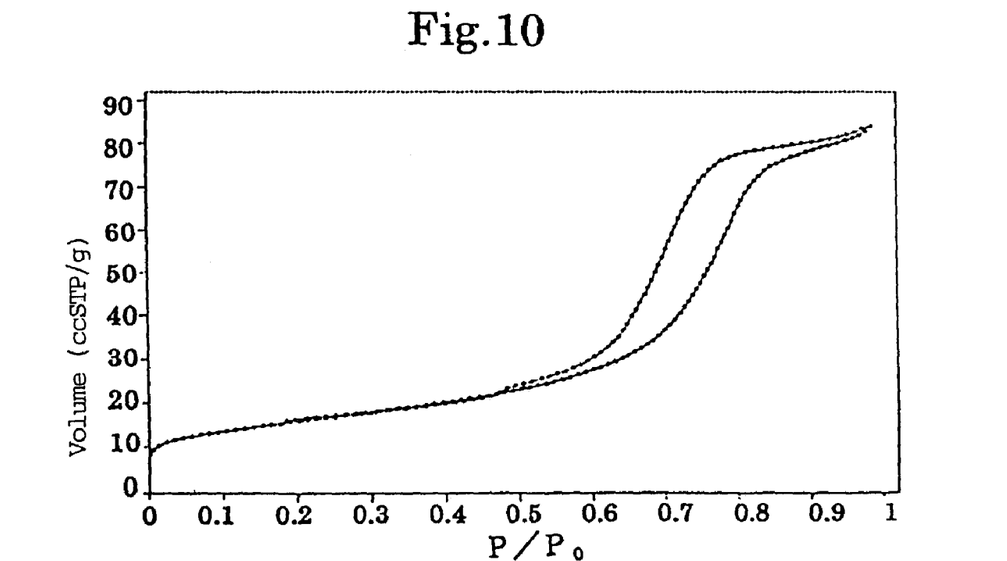
FIG. 10 is a graph showing the $N_2$ adsorption isotherm line of a transition metal oxide after the primary calcination and after the secondary calcination of Example 3.

In FIG. 9, the X-ray diffraction pattern of meso porous transition metal oxide having the crystalline structure of obtained $Zr_6Nb_2O_{17}$ is shown, and in FIG. 10, the $N_2$ adsorption isotherm lines of the transition metal oxide after the primary calcination and after the secondary calcination are shown.

As mentioned above, tantalum and niobium mixed oxide, $ZnNb_2O_6$ and $Zr_6Nb_2O_{17}$ are illustrated. It is natural that the above mentioned method can be applied to the preparation of meso porous transition metal oxides characterized in that the pore wall of the meso pore has a crystalline structure which is composed of a single transition metal oxide consisting of an above mentioned complex oxide and a single or complex oxide of a transition metal excepting those mentioned above.

POSSIBILITY FOR THE INDUSTRIAL USE

As mentioned above, the present invention involves an excellent effect which makes the provision possible, namely, to provide the material composed of a transition metal oxide characterized in that the pore wall of the meso pore has a crystalline structure, and having meso pores of uniform size and stable structure. The characteristic of uniform and stable meso pore which the material has can be broadly used in various fields, for example, uses in the chemical field such as molecular sieving, catalyst having selective function or catalyst carrier and uses in development of various functional materials which use the special characteristics realized by the structural feature of meso size.

What is claimed is:
1. A method for preparation of the meso porous transition metal mixed oxide characterized in that the pore wall of meso pore has a crystalline structure maintained over whole primary particles comprising,
    adding a transition metal salt which is a precursor of the transition metal mixed oxide into the solution prepared by dissolving a polymer surfactant into organic solvent and dissolving, transforming said transition metal salt to a sol solution by hydrolysis and polymerization,
    obtaining a gel state product from said sol solution and carrying out a primary calcination on said product at the temperature of 400±50° C. for 5-20 hours, then carrying out a secondary calcination at the temperature of 600-800° C. for 10 minutes to 10 hours,
    wherein said transition metal mixed oxide comprises a mixture of metal elements selected from the group consisting of Zn, Zr, Nb, and Ta.

* * * * *